No. 861,056. PATENTED JULY 23, 1907.
O. SKOG.
VEHICLE WHEEL.
APPLICATION FILED APR. 3, 1907.

2 SHEETS—SHEET 1.

WITNESSES
Edwin G. Bromley
R. W. Hardie

INVENTOR
Olof Skog
BY Munn & Co.
ATTORNEYS

No. 861,056. PATENTED JULY 23, 1907.
O. SKOG.
VEHICLE WHEEL.
APPLICATION FILED APR. 3, 1907.

2 SHEETS—SHEET 2.

WITNESSES
E. G. Bromley.
R. W. Hardie

INVENTOR
Olof Skog
BY Munn & Co
ATTORNEYS

UNITED STATES PATENT OFFICE.

OLOF SKOG, OF NEW YORK, N. Y.

VEHICLE-WHEEL.

No. 861,056.  Specification of Letters Patent.  Patented July 23, 1907.

Application filed April 3, 1907. Serial No. 366,136.

*To all whom it may concern:*

Be it known that I, OLOF SKOG, a citizen of the United States, and a resident of the city of New York, (borough of Manhattan,) in the county and State of New York, have invented a new and Improved Vehicle-Wheel, of which the following is a full, clear, and exact description.

This invention is designed to provide a vehicle wheel with means simple in construction, effective in operation and durable in use, adapted to overcome the shocks and jars caused in traveling over a rough or uneven road bed, without the use of pneumatic tires.

Figure 1:
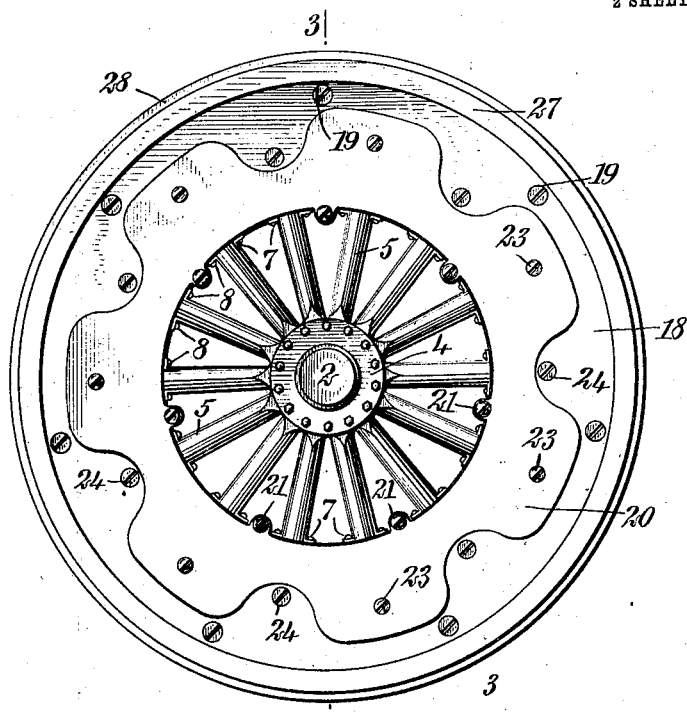
Figure 2:
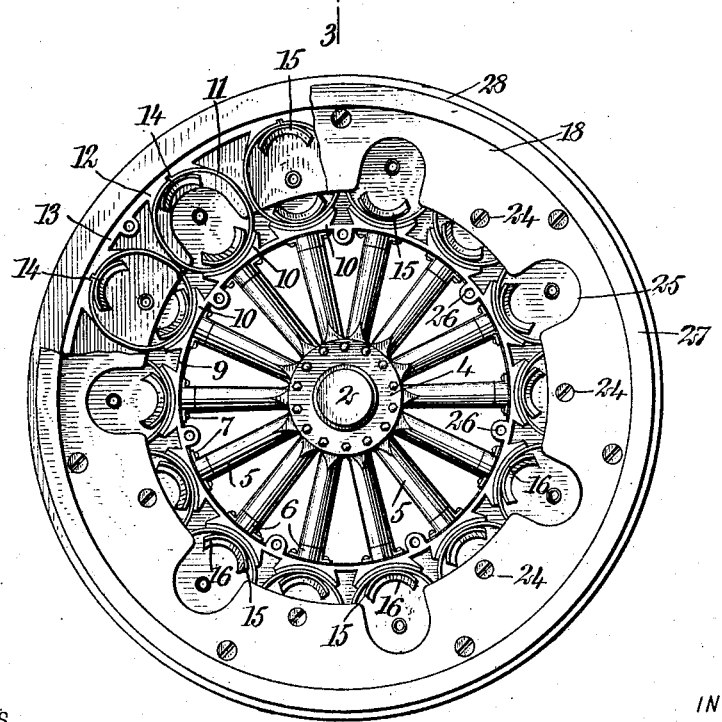
Figure 3:
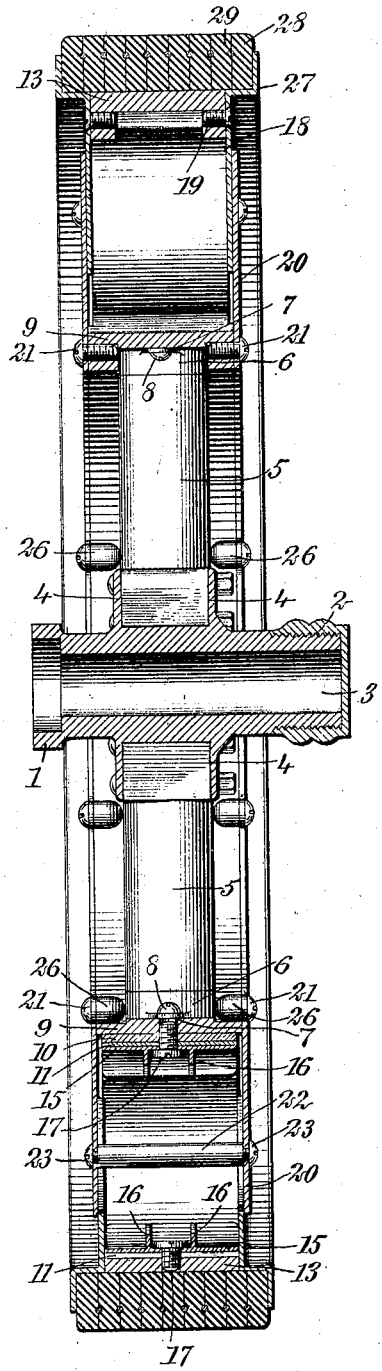

Other objects relating to the specific construction and special arrangement of the several parts will be understood from the following description and accompanying drawings, which illustrate my invention in its preferred form, and in which Figure 1 is a side elevation of a wheel embodying my invention; Fig. 2 is a side elevation partly broken away, of the device shown in Fig. 1 with the inner guard removed; and Fig. 3 is a vertical transverse central section taken on the line 3—3 of Fig. 1.

Like characters of reference designate corresponding parts in all the views.

As illustrated in the drawings, the hub 1 of the wheel is provided on its outer end with a cap 2 having a threaded engagement in said hub and adapted to cover the bore of the wheel. The hub is also provided with flanges 4 forming pockets adapted to receive the inner ends of spokes 5; the outer ends of said spokes being seated in socket heads 6 provided with flanges 7 which are attached by means of screws 8 to a rim 9. This rim is provided on its outer periphery with a plurality of saddles 10 adapted to receive the inner portion of elliptical springs 11, the opposite portion of said springs being seated on oppositely disposed corresponding saddles 12 formed on the inner surface of an outer rim 13. The springs 11 are preferably made of band metal, elliptical in form and the terminals 14 of the band offset from the body thereof and seated in recesses formed in the saddles 12. The springs are held on their respective saddles by means of reinforcing clamps 15 which have a more abrupt curvature than the adjacent portion of the springs 11 so as to permit the springs to be increased in the direction of their longitudinal axis and reinforce said portion of the springs when so extended. The clamps 15 correspond substantially in width with the springs 11, and are preferably provided with transverse ribs 16 forming pockets or recesses adapted to receive screws 17 by means of which the clamps and springs are secured to the saddles of the inner rim 9 and outer rim 13. The outer rim 13 and springs 11 are held against torsional movement by means of plate guards 18 arranged on opposite sides of the rim 13, and secured thereto by means of screws 19. Guards 20 are also attached to the opposite sides of the inner rim 9 by means of screws 21, and the outer portions of the oppositely disposed guards 20 are connected together by means of spools or sleeves 22 and engaging screws 23, the ends of the spools bearing against the inner wall of the guards 20, being threaded to receive the screws 23. Sleeves also connect the inner portion of the outer guards 18. These sleeves, not shown, are similar to the sleeves 22 connecting the outer portion of the inner guards 20 and are adapted at their ends to receive screws 24 by means of which the guards and sleeves are clamped firmly together. The outer guards 18 are cut away between the screws 24 as at 25, thereby forming apertures adapted to receive the sleeves 22 of the inner guards 20 and permit said sleeves to move freely therein when the wheel is in operation. Lugs 26 are attached to the inner rim of the wheel and threaded to receive the screws 21 which bind the inner guards 20 to the inner rim of the wheel. The outer guards 18 are provided with outer flanges 27 adapted to support the sides and outer portion of a tire which is mounted upon the outer rim 13. This tire may be of various constructions, but consists preferably of a plurality of flat rings 28 formed of raw hide leather vulcanized fiber, or other suitable material, with a plurality of wire rings 29 arranged between the sides of the rings 28 and embedded therein so as to prevent the rings from stretching.

In constructing the device, the tire is applied to the outer rim and the outer guards 18 are then attached to the outer rim in the manner already described. By means of such construction the tire may be readily removed and replaced when occasion so requires. When in use, the wheel may be made resilient to any desired extent consistent with the weight it is required to support, by varying the shape, thickness and flexibility of the springs connecting the inner and outer rims. While but a single leaf is used to form the spring shown herein, the springs may be made of more than one leaf if desired. By means of the construction herein shown and described, the wheel is free to yield to the inequalities or roughness of the road and relieve the occupants or objects carried in the vehicle from the jars and shock occasioned in passing over a rough or uneven road. The interlocking and overlapping character of the inner and outer guards 18 and 20 holds the sections of the wheel against lateral or torsional movement relatively to each other, and yet permits said parts to yield in radial lines.

Having thus described my invention, what I claim as new and desire to secure by Letters Patent is:

1. A wheel having an inner rim and an outer rim, each provided with oppositely disposed saddles, elliptical band springs attached at opposite portions to said rims, guards attached to the outer rim and provided with spools connected with said guards, and cut-away portions between said spools, and plate guards attached to the inner rim and provided with connecting spools adapted to move in the cut-away portions of the outer guard.

2. A wheel having an inner rim and an outer rim, each provided with oppositely disposed saddles, elliptical band springs secured at opposite portions to said saddles, reinforcing clamps attached to opposite portions of said springs and to said rims, and having a more abrupt curvature than that of the springs, and overlapping plate guards secured to the opposite sides of said rims respectively.

3. A wheel having an inner rim and an outer rim, each provided with curved saddles, elliptical band springs attached at opposite portions to said rims, and provided with off-set terminals recessed in said saddles, and overlapping plate guards attached to the opposite sides of said rims, respectively.

4. A wheel having an outer rim, oppositely disposed plate guards attached to said rim and provided with off-set outer edges, a tire mounted on said rim and plate guards, comprising a plurality of flat rings, and a plurality of wire rings interposed between the sides of the first named rings.

5. A wheel having an inner rim and an outer rim, each provided on their opposite faces with saddles, band springs seated on said saddles, outer plate guards attached to the outer rim and provided with cut-away portions, plate guards attached to the inner rim and provided with cut-away portions arranged alternately with the cut-away portions of the outer guards, spools extending between the inner faces of the outer guards and attached thereto, and spools attached to the inner faces of the inner guards, and adapted to move in the cut-away portion of the outer guards.

In testimony whereof I have signed my name to this specification in the presence of two subscribing witnesses.

OLOF SKOG.

Witnesses:
ROBERT W. HARDIE,
EVERARD B. MARSHALL.